(12) United States Patent
Fuse

(10) Patent No.: US 9,158,524 B2
(45) Date of Patent: Oct. 13, 2015

(54) INFORMATION PROCESSING APPARATUS AND METHOD THEREFOR

(71) Applicant: CANON KABUSHIKI KAISHA, Tokyo (JP)

(72) Inventor: Hiroshi Fuse, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/853,875

(22) Filed: Mar. 29, 2013

(65) Prior Publication Data

US 2013/0268925 A1 Oct. 10, 2013

(30) Foreign Application Priority Data

Apr. 4, 2012 (JP) ................................. 2012-085499

(51) Int. Cl.
*G06F 9/44* (2006.01)
*G06F 9/445* (2006.01)
*G06F 11/36* (2006.01)

(52) U.S. Cl.
CPC ...... *G06F 8/61* (2013.01); *G06F 8/65* (2013.01)

(58) Field of Classification Search
USPC ........................................................ 717/169
See application file for complete search history.

(56) References Cited

U.S. PATENT DOCUMENTS

| 6,363,499 | B1* | 3/2002 | Delo et al. ...................... 714/15 |
| 6,490,055 | B1* | 12/2002 | Shimizu .......................... 358/1.9 |
| 7,162,716 | B2* | 1/2007 | Glanville et al. .............. 717/151 |
| 7,987,065 | B1* | 7/2011 | de Waal et al. ................ 702/119 |
| 2002/0093505 | A1* | 7/2002 | Hill et al. ........................ 345/543 |
| 2003/0218628 | A1* | 11/2003 | Deshpande et al. ........... 345/738 |
| 2004/0153778 | A1* | 8/2004 | Cheng .............................. 714/25 |
| 2008/0098389 | A1* | 4/2008 | Akiyoshi et al. .............. 717/175 |
| 2009/0322764 | A1* | 12/2009 | Saini et al. ..................... 345/501 |
| 2014/0143770 | A1* | 5/2014 | Oberai et al. .................. 717/174 |

FOREIGN PATENT DOCUMENTS

JP 2004-129246 A 4/2004

OTHER PUBLICATIONS

Anand Khanse, "Internet Explorer Hardware Acceleration: Enable, Disable, Troubleshoot, FAQ" Feb. 7, 2012, published online at <http://www.thewindowsclub.com/software-rendering-hardware-acceleration-internet-explorer-9>.*
Eric Law, "Understanding the IE9 Software Rendering Mode" Feb. 16, 2011, published online at <http://blogs.msdn.com/b/ieinternals/archive/2011/02/17/ie9-benchmark-tests-and-gpu-fallback-to-software-rendering-mode.aspx>.*

* cited by examiner

*Primary Examiner* — James D Rutten
(74) *Attorney, Agent, or Firm* — Canon USA, Inc. IP Division

(57) ABSTRACT

An information processing apparatus, in which an operating system operates, includes a setting unit and a control unit. The setting unit sets, in a case that an application is installed and if an installation target application is installed by updating or if the operating system is not a predetermined version, to activate the installation target application in a hardware rendering mode. The control unit install, if software necessary for installing the installation target application is not installed, the necessary software, wherein the control unit installs the installation target application after installation of the necessary software, and wherein the installed application is activated according to a setting by the setting unit.

9 Claims, 14 Drawing Sheets

600

PROCESSING OF INSTALLED APPLICATION

INFORMATION PROCESSING APPARATUS AND METHOD THEREFOR

BACKGROUND OF THE INVENTION

1. Field of the Invention

The present invention relates to processing procedures for installing software and performing an environment check and recovery thereof.

2. Description of the Related Art

Along with improvement in functions of applications, system changes which are necessary for using software have increased year after year. Items needs to be changed in the system include an increase of a number of modules arranged in the system, addition of descriptions to a registry necessary for operating modules, changes in a security setting of an operating system (OS), and so on and so forth. In addition, some applications may operate using other company's software, and the other company's software need to be installed in advance. For example, Windows Presentation Foundation application (hereinafter, referred to as a WPF application) has a problem in that the WPF application does not properly operate if ".NetFramework" (i.e., other company's software) in a version corresponding to the WPF application is not installed in a system environment (hereinafter, referred to as environment).

In view of such a problem, in a case where software necessary for an operation of an application is not installed, software necessary for the operation of the application is generally installed during installation processing of an installer of the relevant application. However, in a case where software necessary for the operation of the application has been already installed in the environment but there is any defect in the environment of the installed software (presence of files, registry information, or environment variables), there is concern that the application may not operate correctly.

Thus, conventionally, a technique for determining during installation processing of software whether an installation target application properly operates and determining whether to install the application before installing the application, is discussed. (for example, Japanese Patent Application laid-Open No. 2004-129246) According to the technique, since whether the application properly operates can be determined during installation processing, and thus, an issue such that the installation target application does not properly operate can be prevented. In addition, it is described that various pieces of product information such as product identification (ID), a vendor name, an application name, a version, and necessary resources are used for the determination.

In the above-described conventional technique, whether the application can be used is determined from the product information of the target application before the application is installed, and thus it is determined whether to install the application. In this case, if it is determined that the application is cannot be used by an installer, eventually the application cannot be installed.

Further, in addition to the viewpoints of the above-described conventional technique, it is also necessary to take into consideration the occurrence of defects in the operation of OS resulting from installation of the application due to an issue relating to hardware. For example, when the WPF application is activated, the OS may go into a blue screen state due to defects associated with a chipset and a driver. If a user who has fallen into such a situation is not familiar with software or hardware, sometimes the user cannot take a solution for properly operating the application.

SUMMARY OF THE INVENTION

The present invention is directed to a technique capable of establishing an environment in which an application can operate properly by, for example, recovering the environment in a case where it is determined that there is a problem with the environment during processing of an installer.

According to an aspect of the present invention, an information processing apparatus in which an operating system operates includes a setting unit configured to set, in a case that an application is installed and if an installation target application is installed by updating or if the operating system is not a predetermined version, to activate the installation target application in a hardware rendering mode, and a control unit configured to install, if software necessary for installing the installation target application is not installed, the necessary software, wherein the control unit installs the installation target application after installation of the necessary software, and wherein the installed application is activated according to a setting by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
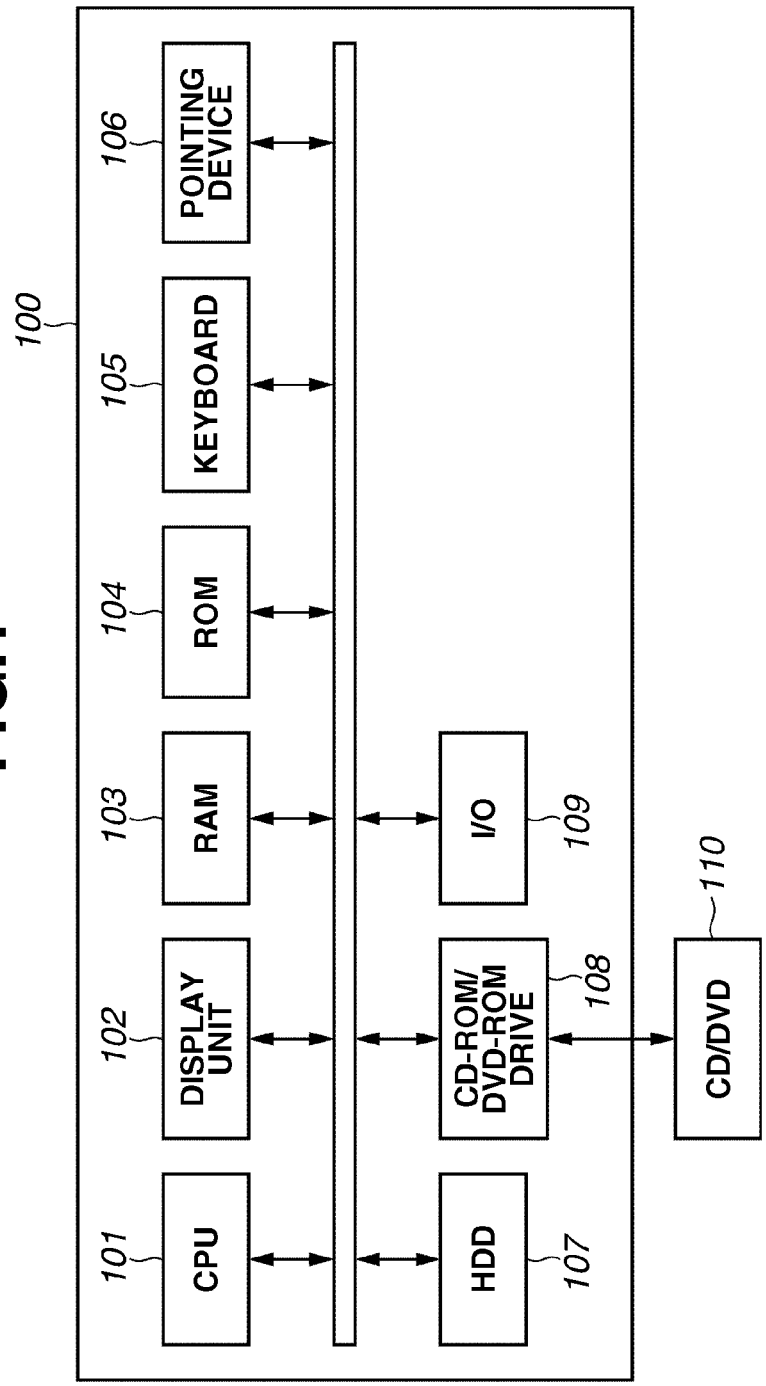
FIG. 1 illustrates a hardware configuration of an information processing apparatus.

FIG. 1 illustrates a hardware configuration of an information processing apparatus 100 according to a first exemplary embodiment of the present invention. In FIG. 1, the information processing apparatus 100 is a computer used by a user. In the information processing apparatus 100, a predetermined operating system (OS) is installed, and various types of applications for executing specific functional processing are also installed.

Further, the information processing apparatus 100 is provided with a keyboard 105 and a pointing device 106 serving as input devices that receive user operation input. Furthermore, the information processing apparatus 100 includes a display unit 102 that provides visual output information feedback to a user. The information processing apparatus 100 includes storage devices such as a random access memory (RAM) 103, a read only memory (ROM) 104, and a hard disk drive (HDD) 107 that store various programs and execution information according to the present exemplary embodiment. The information processing apparatus 100 further includes a compact disk ROM (CD-ROM)/digital versatile disk ROM (DVD-ROM) drive 108 for reading data recorded in a CD/DVD 110. Other control programs including the OS and a control program for realizing the present invention are loaded into the RAM 103 and executed by a central processing unit (CPU) 101. The RAM 103 also functions as various types of work areas and temporary save areas used for executing the control program. The ROM 104 stores various types of control programs for the CPU 101 to execute various types of control. The information processing apparatus 100 further includes an interface device input/output (I/O) 109 for communication with external devices and the CPU 101 that executes programs. A connection configuration to peripheral devices may be wired or wireless.

Figure 2:
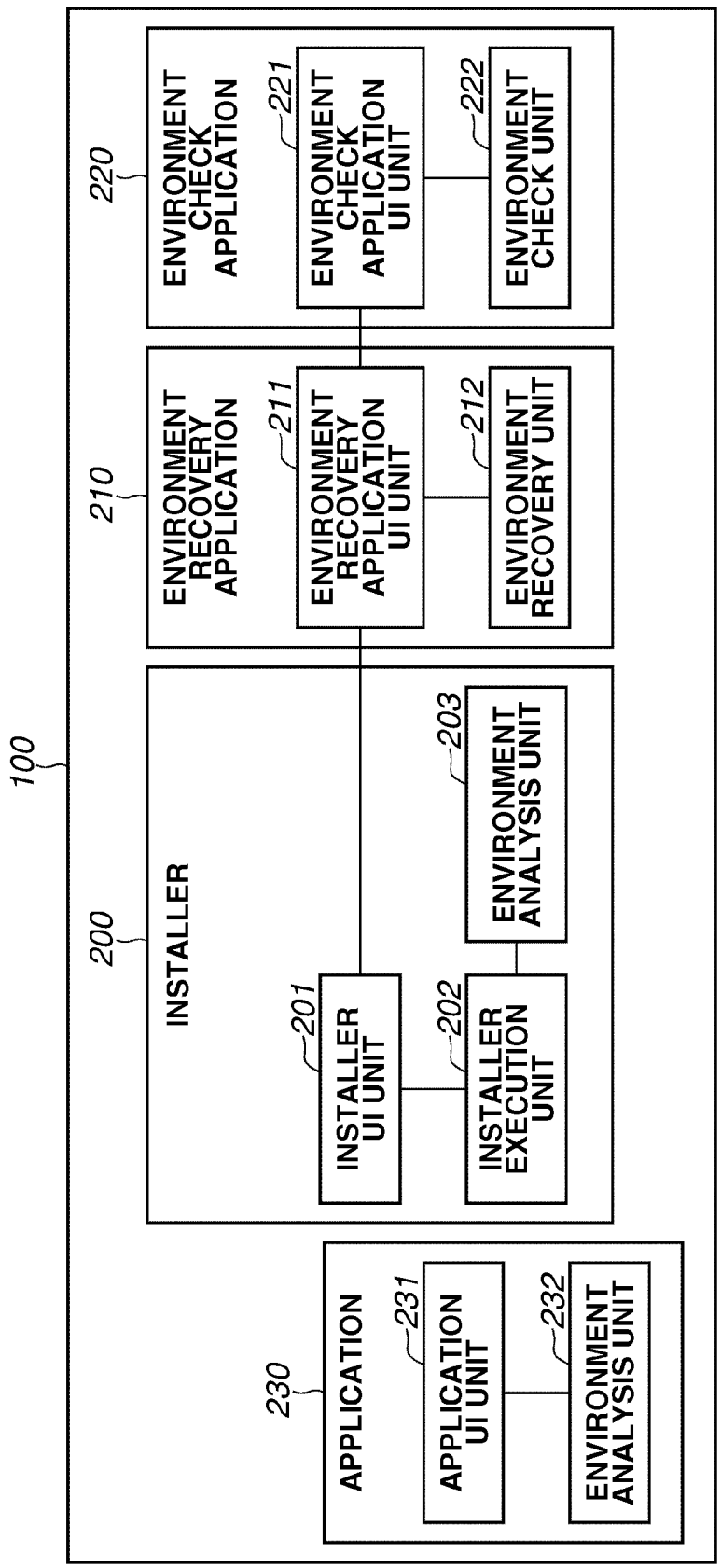
FIG. 2 illustrates a software configuration of an information processing apparatus.

FIG. 2 is a software configuration diagram illustrating a software configuration of the information processing apparatus 100.

An installer 200 includes various types of user interfaces for executing installation processing of applications, receives a request from a user on a desktop of the information processing apparatus 100, and comprehensively manages execution of each functional processing. In addition, the installer 200 is stored in the HDD 107, or the CD/DVD 110, and performs program execution by the CPU 101, stores execution information or temporary data in the RAM 103. An environment recovery application 210 and an environment check application 220 described below are similar to the installer 200.

The installer 200 includes components 201 to 203.

An installer UI unit 201 handles establishment of a user interface and reception of various types of input operations from a user in the installer 200. An installer execution unit 202 performs functions of installation, uninstallation, and recovery installation of applications or setting establishment of applications in the installer 200. Further, the installer execution unit 202 changes installation processing (described below) based on information analyzed by an environment analysis unit 203. The environment analysis unit 203 performs a function of analyzing environment information of the information processing apparatus 100 in the installer 200. The environment information indicates, for example, architecture information of the OS, version information of the OS, registry information, environment variables, software information of already-installed software, and various settings of an installation target application.

The environment recovery application 210 includes various types of user interfaces for recovering an environment of the information processing apparatus 100, receives a request from a user on the desktop of the information processing apparatus 100, and comprehensively manages execution of each functional processing.

An environment recovery application UI unit 211 handles establishment of a user interface and reception of various types of input operations from a user in the environment recovery application 210. The environment recovery application UI unit 211 executes processing according to responses of the installer UI unit 201 and an environment check application UI unit 221. An environment recovery unit 212 performs a function of recovering the environment of the information processing apparatus 100 by the environment recovery application 210. The environment indicates registry information and a file relating to, for example, ".Net Framework" and "Visual C++ Redistributable", and environment variables registered in the information processing apparatus 100.

The environment check application 220 includes various types of user interfaces for checking the environment of the information processing apparatus 100, receives a request from a user on the desktop of the information processing apparatus 100, and comprehensively manages execution of each functional processing. The environment check application 220 is an application for testing with the similar type to that of an application 230 which is an installation target of the installer 200. As the usage of the environment check application 220, the environment check application 220 is executed to check whether the application 230 properly operates, before the application 230 is actually installed, and operation verification is performed. As its function, the environment check application 220 has a display function of providing a screen illustrated in FIG. 6 described below at best.

The environment check application UI unit 221 handles establishment of a user interface and reception of various types of input operations from a user in the environment check application 220. In addition, the environment check application UI unit 221 executes the processing according to responses of the environment recovery application UI unit 211. An environment check unit 222 performs a function of checking whether there is any defect in the environment of the information processing apparatus 100 by the environment check application 220.

The application 230 includes various types of user interfaces for executing applications, receives a request from a user on the desktop of the information processing apparatus 100, and comprehensively manages execution of each functional processing. The application 230 is installed in the HDD 107 by the installer 200, performs program execution by the CPU 101, and stores execution information and temporary data in the RAM 103.

An application UI unit 231 handles establishment of a user interface and reception of various types of input operations from a user in the application 230. An environment analysis unit 232 performs a function of analyzing environment information of the information processing apparatus 100 in the application 230.

Figure 3:
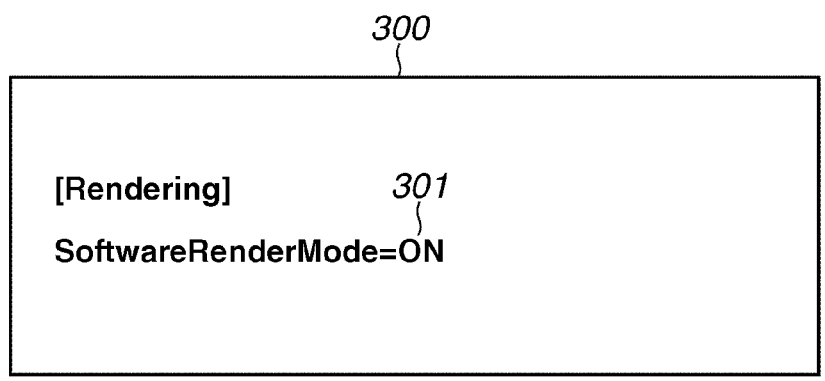
FIG. 3 illustrates an example of a setting value in a rendering mode of an application.

FIG. 3 illustrates an example of a setting value of a rendering mode of an application. Before FIG. 3 is described, the rendering mode will be described below.

An internal architecture of the WPF application includes two rendering methods, namely hardware rendering and software rendering, and processing of hardware rendering is generally performed at a higher speed than that of software rendering. In a case where a setting of the rendering mode is not made explicitly, an application is generally activated in a hardware rendering mode. However, if there is any defect in a driver and a mother board of a video card, when the WPF application is activated in the hardware rendering mode, a blue screen may occur. Therefore, in a case where any defect is likely to occur under such a situation, it is desirable to activate the WPF application in a software rendering mode. Processing of the hardware rendering is performed by graphics processing unit (GPU), and processing of the software rendering is performed by the central processing unit (CPU).

Rendering mode setting information 300 includes a rendering mode setting value 301 of the WPF application. The rendering mode setting value 301 stores a setting value for activating the WPF application in any one of the hardware rendering and software rendering. The environment check application 220 and the application 230 read the rendering mode setting value 301 and determine a rendering mode of the application. The details of the determination processing will be described below.

Figure 4:
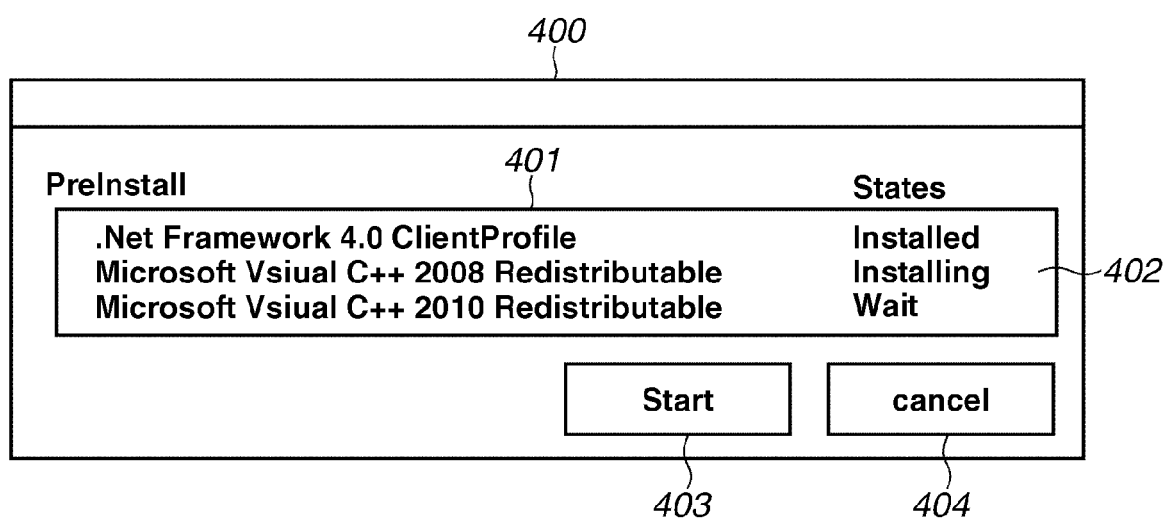
FIG. 4 illustrates an example of a user interface (UI) of an installer screen.

FIG. 4 illustrates an example of a user interface of an installer screen. An installer main window 400 indicates a user interface of the installer UI unit 201.

A software list 401 indicates a list of software pieces that need to be installed in the information processing apparatus 100 before the application is installed. A software installation state 402 indicates installation states of the software pieces listed in the software list 401. In this case, the software installation state 402 indicates install-state information such as installed and not yet installed. The environment analysis unit 203 determines whether the software has been installed immediately before displaying the installer screen 400, and if the software has been already installed, the software installation state 402 is displayed as "installed" at the time of display of the installer screen 400.

When an installation start button 403 is pressed, the software pieces listed in the software list 401 are installed in order from top to bottom. When all of the installation processing is finished, the word displayed on the installation start button 403 is changed from "Start" to "Next". In addition, in a case where necessary software pieces are all installed, a Next button (not illustrated) is displayed. By pressing the Next button (not illustrated), the installation processing is shifted to the next processing. When an installation cancel button 404 is pressed, the installation processing is suspended and terminated.

Figure 5:
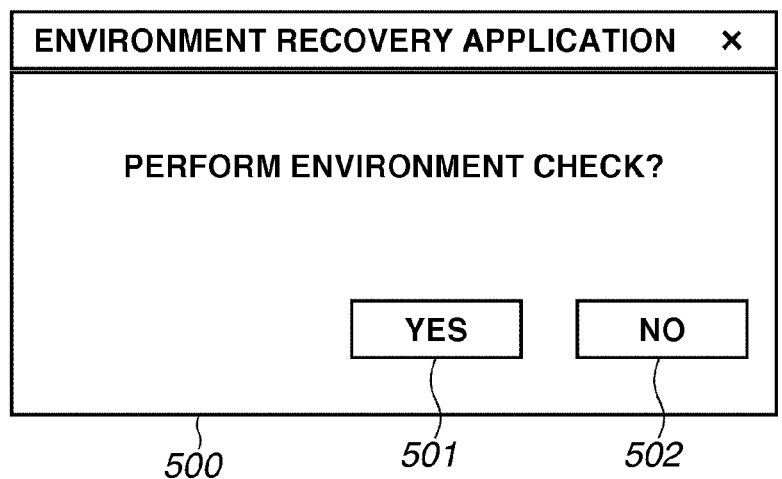
FIG. 5 illustrates an example of a UI of an environment recovery application.

FIG. 5 illustrates an example of a user interface of the environment recovery application 210.

An environment recovery application window 500 indicates a user interface of the environment recovery application UI unit 211. The environment recovery application window 500 is provided with selection buttons 501 and 502 for selecting whether to perform the environment check. When the selection button 501 is pressed, the environment check application 220 is activated. On the other hand, when the selection button 502 is pressed, the environment check application 220 is not activated, and the processing is shifted to the next installation processing.

Figure 6:
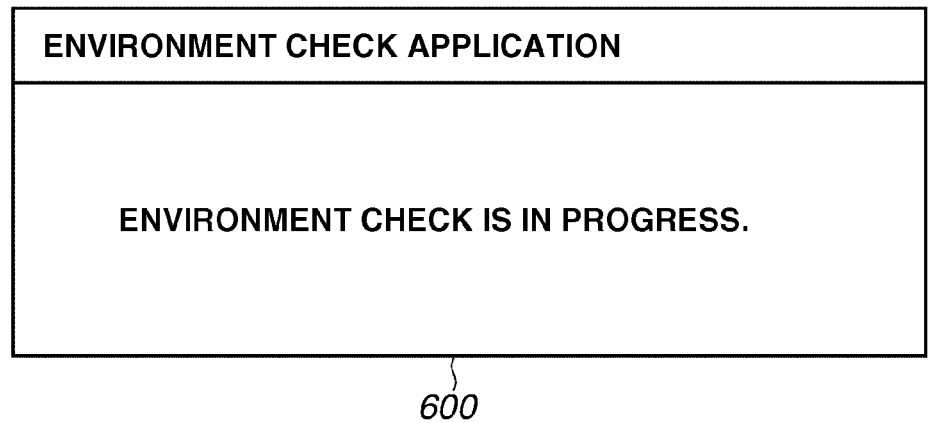
FIG. 6 illustrates an example of a UI of an environment check application

FIG. 6 illustrates an example of a user interface of the environment check application 220.

An environment check application window 600 indicates a user interface of the environment check application UI unit 221. The environment check application window 600 A is displayed when the environment check is in progress, and when the environment check is finished, the environment check application window 600 is closed, and the processing is shifted to the next installation processing. In a case where a defect is found by the environment check, the environment check application window 600 is closed, and the environment recovery application 210 is activated. In the present example, although the WPF application is adopted to analyze a defect in the ".NetFramework" or the blue screen, the type of the application is not limited.

Figure 7:
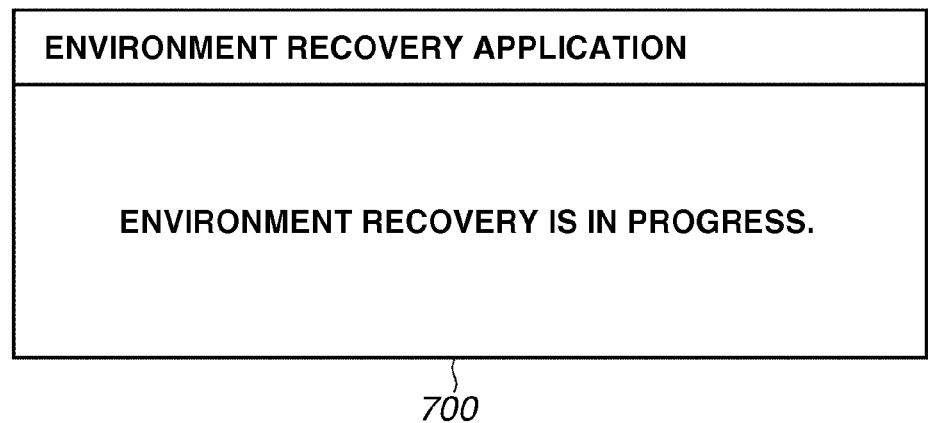
FIG. 7 illustrates an example of UI of an environment recovery application

FIG. 7 illustrates an example of a user interface of the environment recovery application 210. An environment recovery application window 700 indicates a user interface of the environment recovery application UI unit 211. The environment recovery application window 700 is displayed when the environment recovery is in progress, and when the environment recovery is finished, the environment recovery application window 700 is closed, and the processing is shifted to the next installation processing.

Figure 8:
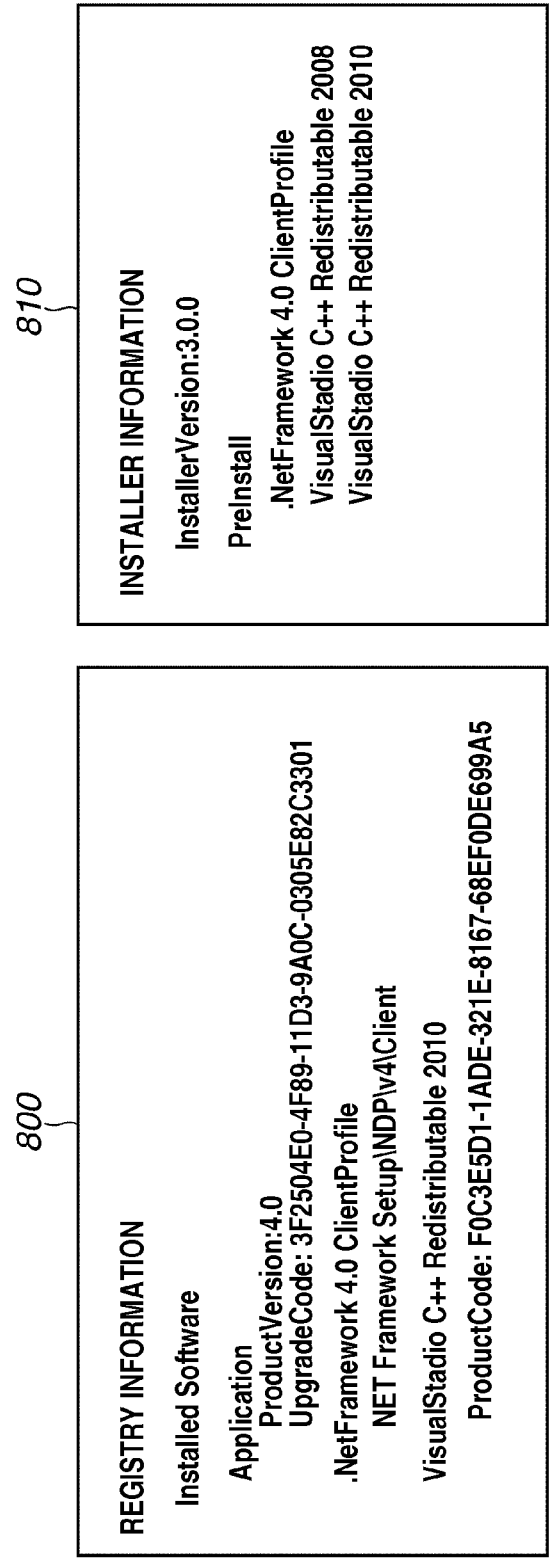
FIG. 8 illustrates examples of registry information and installer information.

FIG. 8 illustrates examples of registry information 800 of the information processing apparatus 100 and installer information 810 of the installer 200. These pieces of information are used in the installation processing of the installer 200.

The registry information 800 indicates a registry information list of the information processing apparatus 100, and stores therein information of software pieces installed in the information processing apparatus 100. For example, the registry information 800 includes version information, UpgradeCode, ProductCode, an install-path of an application.

The installer information 810 stores therein information necessary for installation processing of the installer 200. For example, the installer information 810 includes a version of the installer and software information necessary for installation of the installation target application. The user interface of the above-described software list 401 is generated from the information.

Figure 9:
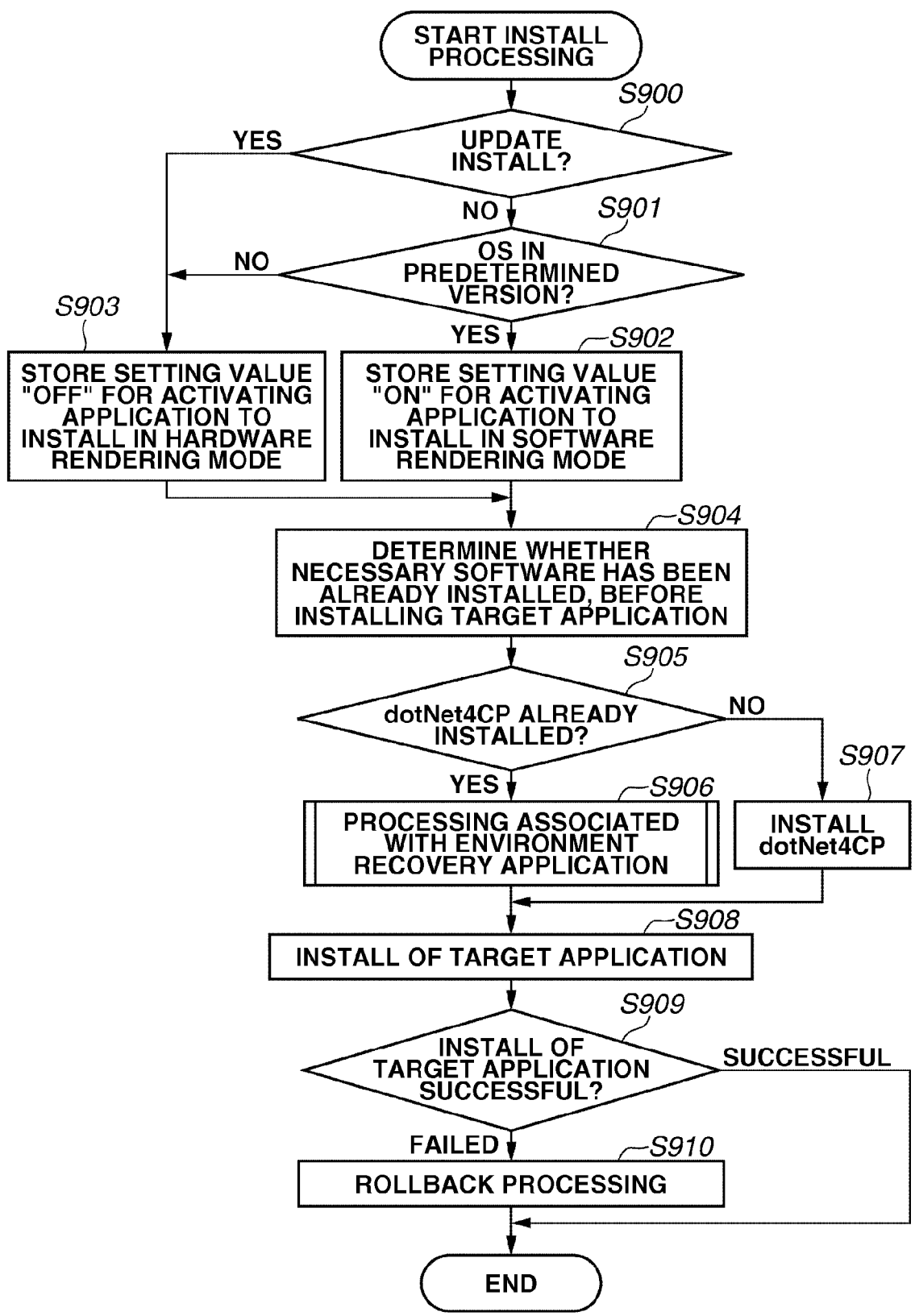
FIG. 9 is a flowchart illustrating installation processing performed by an installer.

FIG. 9 is a flowchart illustrating the installation processing performed by the installer 200. The processing in the flowchart is started by the installer UI unit 201 receiving an operation indicating execution of the installation as a trigger.

In step S900, the installer execution unit 202 determines whether the installer 200 is executed as update installation based on the registry information 800 and the installer information 810 via the environment analysis unit 203. A version of the application stored in the registry information 800 is compared with a version of the installer stored in the installer information 810. If the version of the installer 200 is higher, it is determined as update installation (YES in step S900), and the processing proceeds to step S903. On the other hand, if an application which can be subjected to update installation is not included in the registry information 800, it is not determined as update installation (NO in step S900), and the processing proceeds to step S901.

In step S901, the installer execution unit 202 determines whether a version of the OS of the information processing apparatus 100 is a predetermined version via the environment analysis unit 203. More specifically, it is determined whether a version of the OS of the information processing apparatus 100 is Windows XP or Windows Vista. As a result of determination processing of the OS of the information processing apparatus 100, if it is determined that the OS of the information processing apparatus 100 is Windows XP or Windows Vista (YES in step S901), the processing proceeds to step S902. On the other hand, if it is not determined that the OS of the information processing apparatus 100 is Windows XP or Windows Vista (NO in step S901), the processing proceeds to step S903. In this processing, the reason for using a version of the OS as a determination basis is that there is a concern about occurrence of a blue screen defect in Windows XP or Windows Vista from the past examples. If it is assumed that defects may occur in versions other than the above-described OS versions, other versions can be added to determination processing.

In step S902, the installer execution unit 202, as illustrated in FIG. 3, stores a setting value for activating the WPF application, which is an installation target of the installer, in the software rendering mode in the rendering mode setting information 300.

In step S903, the installer execution unit 202 stores a setting value for activating the WPF application not in the software rendering mode in the rendering mode setting information 300. More specifically, the WPF application is activated in the hardware rendering mode. In the case of the update installation, it is assumed that the user can have properly used the WPF application which is not yet updated before installing the application this time. Therefore, in this case, setting is performed to activate the WPF application in the hardware rendering mode.

In step S904, the installer execution unit 202 determines an installation state of software necessary for operations of the installation target application based on the registry information 800 and the installer information 810 via the environment analysis unit 203. For example, an installation state determination logic is as follows, if information of software stored in the installer information 810 is not stored in the registry information 800, it is determined that necessary software is not yet installed. On the other hand, if it is stored in the registry information 800, it is determined that necessary software has been already installed. Through the determination processing, the software list 401 and the software installation state 402 are displayed on the installer main window 400. When the installer UI unit 201 receives an operation indicating that the installation start button 403 or the Next button (not illustrated) has been pressed, the processing proceeds to step S905.

In step S905, the installer execution unit 202 determines whether ".NetFramework" (dotNet4CP)" which is software necessary for operations of the installation target application has been already installed via the environment analysis unit 203. More specifically, if it is determined that ".NetFramework" has been already installed (YES in step S905) by the installation state determination logic in step S904, the processing proceeds to step S906. On the other hand, if it is determined that ".NetFramework" has not been installed (NO in step S905) by the installation state determination logic in step S904, the processing proceeds to step S907.

In step S906, the installer execution unit 202 activates the recovery application 210 for recovering the environment of the information processing apparatus 100. The details thereof will be described below with reference to FIG. 10. On the other hand, in step S907, the installer execution unit 202 installs ".NetFramework".

In step S908, the installer execution unit 202 install the application 230, that is an installation target.

In step S909, the installer execution unit 202 determines whether the entire installation processing including from installation of software to installation of application has been properly performed. If the installation processing has been properly performed while executing the installer, it is determined that installation of the application has been successful (SUCCESSFUL in step S909), and the processing in the present flowchart ends. On the other hand, if the installation processing has not been properly performed while executing the installer, it is determined that installation of the application has failed (FAILED in step S909), and the processing proceeds to step S910.

In step S910, the installer execution unit 202 performs rollback processing for rolling back the information used in the installation processing to the point before the installation processing. The information used in the installation processing refers to, for example, an installed file, a temporary file, or a registry. If installation of the application has failed, rollback processing of software pieces which were necessary for installation of the application is not performed. However, if the installation processing has failed during the installation of these software pieces, the installer execution unit 202 performs rollback processing in accordance with specification of the software. After the rollback processing is completed, the processing in the present flowchart ends.

Figure 10:
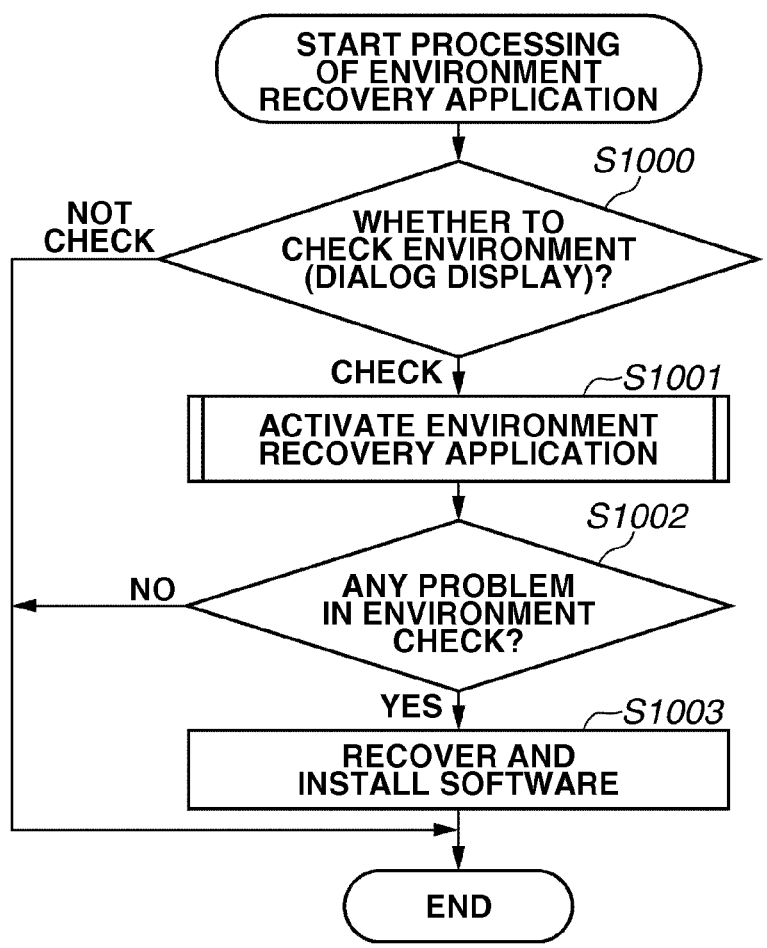
FIG. 10 is a flowchart illustrating environment recovery processing performed by an environment recovery application

FIG. 10 is a flowchart illustrating the environment recovery processing performed by the environment recovery application 210 associated with the above-described step S906. The processing in the flowchart is started by the environment recovery application UI unit 211 receiving an operation indicating execution of environment recovery from the installer UI unit 201 as a trigger.

In step S1000, the environment check application UI unit 211 determines whether to perform an environment check of the information processing apparatus 100. Upon receiving an operation indicating that the selection button 501 for performing the environment check is pressed, the environment check application UI unit 211 determines to perform the environment check (CHECK in step S1000), and the processing proceeds to step S1001. On the other hand, upon receiving an operation indicating that the selection button 501 for not performing the environment check is pressed, the environment check application UI unit 211 determines not to perform the environment check (NOT CHECK in step S1000), and the processing in the present flowchart ends.

In step S1001, the environment recovery application 210 activates the environment check application 220 for checking whether there is any defect in the environment of the information processing apparatus 100. The details will be described below with reference to FIG. 11. In step S1002, it is determined whether there is any problem in a result of the environment check by the environment check application 220. If there is any problem in the environment check (YES in step S1002), it is determined that the environment recovery is performed, and the processing proceeds to step S1003. On the other hand, if there is no problem in the environment check (NO in step S1002), it is determined that the environment recovery is not performed, and the processing in the present flowchart ends.

In step S1003, the environment recovery unit 212 performs installation processing of software for the environment recovery of the information processing apparatus 100. For example, if there is a defect of ".NetFramework" in a result of the environment check in step S1002, then in step S1003, the environment recovery unit 212 performs recovery processing on ".NetFramework". In this case, the recovery processing of ".NetFramework" is performed by updating, or newly installing ".NetFramework" as needed. In addition, the environment recovery application window 700 is displayed during the environment recovery. When the recovery processing ends, the environment recovery application window 700 is closed, and the processing in the present flowchart ends.

Figure 11:
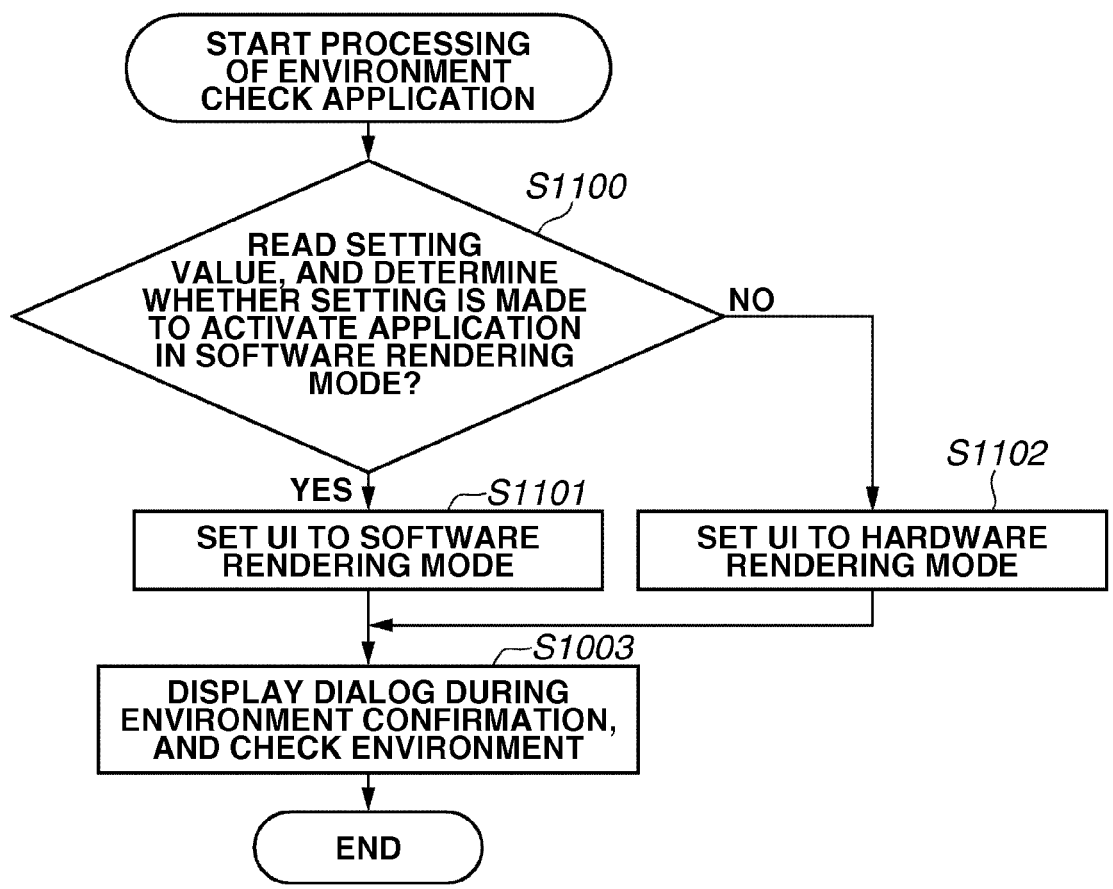
FIG. 11 is a flowchart illustrating environment recovery processing performed by an environment check application.

FIG. 11 is a flowchart illustrating the environment check processing performed by the environment check application 220. The processing in the flowchart is started by the environment check application UI unit 221 receiving an operation indicating execution of the environment check from the environment recovery application UI unit 211 as a trigger.

In step S1100, the environment check unit 222 analyzes the rendering mode setting information 300 generated in steps S902 and S903, and analyzes an activation method of the WPF application. The environment check application 220 is a WPF application which is the same type as that of the application 230 which is an installation target of the installer 200.

If the rendering mode setting information 300 is set to the software rendering mode (YES in step S1100), it is determined that the environment check application 220 is activated in the software rendering mode, and the processing proceeds to step S1101. On the other hand, if the rendering mode setting information 300 is set to the hardware rendering mode (NO in step S1100), it is determined that the environment check application 220 is activated in the hardware rendering mode, and the processing proceeds to step S1102.

In step S1101, the environment recovery application UI unit 211 sets a UI of the environment check application 220 to the software rendering mode. In step S1102, the environment recovery application UI unit 211 sets a UI of the environment check application 220 to the hardware rendering mode.

In step S1103, the environment recovery application UI unit 211 displays the environment check application window 600 in the rendering mode which follows the setting in step S1101 or S1102. Further, in step S1103, the environment recovery application UI unit 211 performs environment check of the information processing apparatus 100. For example, the environment check includes checking of presence or absence of a ".NetFramework" file or registry information. If any problem is found in the check, the environment check application 220 notifies the environment recovery application 210 of the problem.

Figure 12:
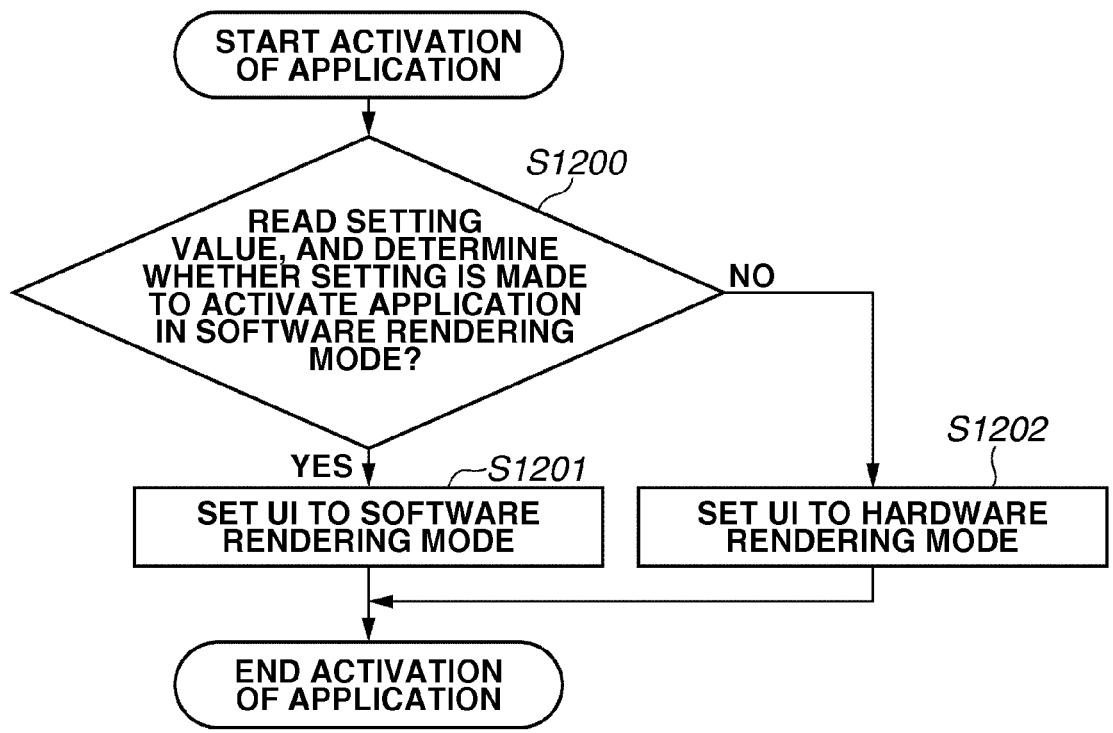
FIG. 12 is a flowchart illustrating application activation processing performed by an application.

FIG. 12 is a flowchart illustrating the activation processing performed by the application 230 installed by the installer 200. The processing in the flowchart is started by the application 230 receiving an operation indicating activation of the application as a trigger.

In step S1200, the environment analysis unit 232 analyzes the rendering mode setting information 300 generated in step S902 or S903, to determines an activation method of the WPF application. In this case, the WPF application refers to the application 230 (hereinafter, the application 230). If the setting of the rendering mode setting information 300 is the software rendering mode, it is determined to activate the application 230 in the software rendering mode (YES in step S1200), and the processing proceeds to step S1201. On the other hand, if the setting of the rendering mode setting information 300 is the hardware rendering mode, it is determined to activate the application 230 in the hardware rendering mode (NO in step S1200), and the processing proceeds to step S1202.

In step S1201, the environment recovery application UI unit 211 sets a UI of the application 230 to the software rendering mode. In step S1202, the environment recovery application UI unit 211 sets a UI of the application 230 to the hardware rendering mode. When settings of the rendering mode in step S1201 or S1202 is determined, the environment recovery application UI unit 211 displays the UI of the application 230, and ends the processing in the flowchart.

According to the first exemplary embodiment, examples in which processing such as the environment recovery and the environment check are performed in accordance with the installation processing in FIGS. 9 to 11 are described. However, there is a case that the environment recovery and the environment check of the information processing apparatus 100 are executed only for the purpose of the environment recovery and the environment check themselves at a timing other than that of the installation processing. In view of such the purpose, the information processing apparatus 100 according to the present exemplary embodiment is configured to be able to perform the environment recovery and the environment check by activating the environment recovery application even if the processing for the environment recovery in FIG. 10, and the processing for the environment check in FIG. 11 are separated from the processing for the installer in FIG. 9. More specifically, if activation is started from the installer, the processing described in FIG. 10 or FIG. 11 can be executed in response to reception of an execution instruction of the environment recovery or check application from the user independently.

Figure 13:
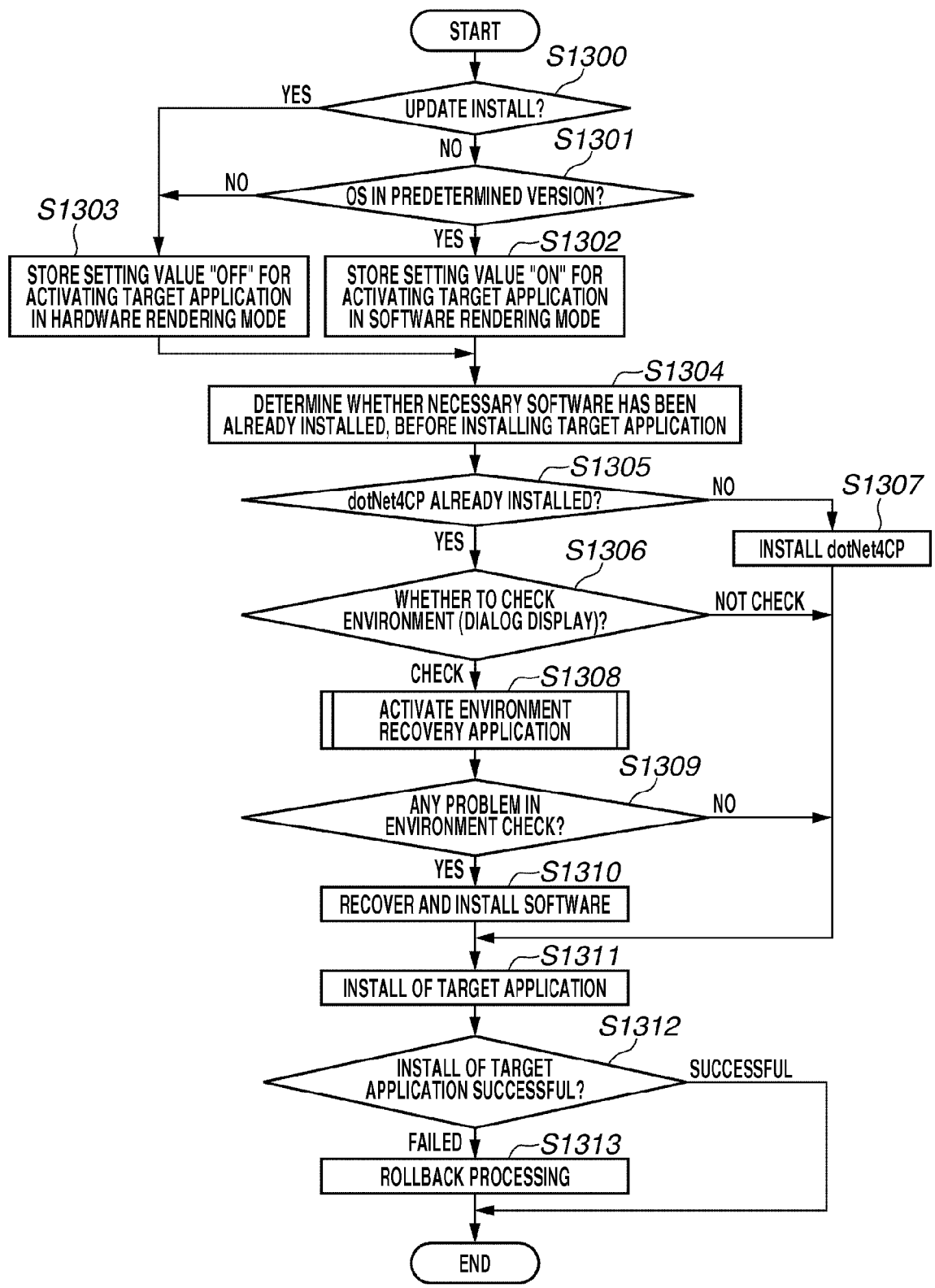
FIG. 13 is a flowchart illustrating installation processing performed by an installer.

According to a second exemplary embodiment, the processing in a case where the installer 200 performs the function of the environment recovery application 210 by adding the processing of the environment recovery application in FIG. 10 to the processing of the installer in FIG. 9 is illustrated in the flowchart in FIG. 13. The processing in the flowchart is started by the installer UI unit 201 receiving an operation indicating execution of the installation as a trigger.

In step S1300, the installer execution unit 202 determines whether the installer 200 is executed as update installation based on the registry information 800 and the installer information 810 via the environment analysis unit 203. A version of the application stored in the registry information 800 is compared with a version of the installer stored in the installer information 810. If the version of the installer 200 is higher, it is determined as update installation (YES in step S1300), and the processing proceeds to step S1303. On the other hand, if an application which can be subjected to update installation is not included in the registry information 800, it is not determined as update installation (NO in step S1300), and the processing proceeds to step S1301.

In step S1301, the installer execution unit 202 determines whether a version of the OS of the information processing apparatus 100 is a predetermined version via the environment analysis unit 203. As a result of determination processing of the OS of the information processing apparatus 100, if it is determined that the OS of the information processing apparatus 100 is Windows XP or Windows Vista (YES in step S1301), the processing proceeds to step S1302. On the other hand, if it is not determined that the OS of the information processing apparatus 100 is Windows XP or Windows Vista (NO in step S1301), the processing proceeds to step S1303.

In step S1302, the installer execution unit 202 stores a setting value for activating the WPF application in the software rendering mode in the rendering mode setting information 300. In step S1303, the installer execution unit 202 stores a setting value for activating the WPF application not in the software rendering mode in the rendering mode setting information 300.

In step S1304, the installer execution unit 202 determines an installation state of software necessary for operations of the application based on the registry information 800 and the installer information 810 via the environment analysis unit 203. For example, an installation state determination logic is as follows, if information of software stored in the installer information 810 is not stored in the registry information 800, it is determined that necessary software is not yet installed. Through the determination processing, the software list 401 and the software installation state 402 are displayed on the installer main window 400. When the installer UI unit 201 receives an operation indicating that the installation start button 403 or the Next button (not illustrated) has been pressed, the processing proceeds to step S1305.

In step S1305, the installer execution unit 202 determines whether ".NetFramework" (dotNet4CP)" which is one of software pieces necessary for operations of the installation target application has been already installed via the environment analysis unit 203. If it is determined that ".NetFramework" has been already installed (YES in step S1305) by the installation state determination logic in step S1304, the processing proceeds to step S1306. On the other hand, if it is determined that ".NetFramework" has not been installed (NO in step S1305), the processing proceeds to step S1307, and the installer execution unit 202 installs ".NetFramework".

In step S1306, the installer UI unit 211 determines whether to perform the environment check of the information processing apparatus 100. If an operation indicating that the selection button 501 for performing the environment check has been pressed is received via a screen (FIG. 5) provided by the installer UI unit 211, the installer UI unit 211 determines to perform the environment check (CHECK in step S1306), and the processing proceeds to step S1308. On the other hand, if an operation indicating that the selection button 502 for not performing the environment check has been pressed is received, the installer UI unit 211 determines not to perform the environment check (NOT CHECK in step S1306), and the processing proceeds to step S1311.

In step S1308, the installer 200 activates the environment check application 220 for checking whether there is any defect in the environment of the information processing apparatus 100. The processing in step S1308 is similar to the processing described in FIG. 11.

In step S1309, the installer UI unit 211 determines whether there is any problem in a result of the environment check by the environment check application 220. If there is any problem in the environment check (YES in step S1309), it is determined that the environment recovery is performed, and the processing proceeds to step S1310. On the other hand, if there is no problem in the environment check (NO in step S1309), it is determined that the environment recovery is not performed, and the processing proceeds to step S1311.

In step S1310, the installer execution unit 202 performs the environment recovery processing of the information processing apparatus 100. In this process, assuming that there is a defect of ".NetFramework" in a result of the environment check in step S1309, the environment recovery unit 212 performs recovery processing on ".NetFramework" in step S1310. In addition, the environment recovery application window 700 is displayed during the environment recovery. When the recovery processing ends, the environment recovery application window 700 is closed, and the processing proceeds to step S1311.

In step S1311, the installer execution unit 202 installs the application 230, that is an installation target.

In step S1312, the installer execution unit 202 determines whether the entire installation processing including installation of software necessary for installation of a target application and installation of the target application itself has been properly performed. If the installation processing has been properly performed while executing the installer, it is determined that installation of the application has been successful (SUCCESSFUL in step S1312), and the processing in the present flowchart ends. On the other hand, if the installation processing has not been properly performed while executing the installer, it is determined that installation of the application has failed (FAILED in step S1312), and the processing proceeds to step S1313.

In step S1313, the installer execution unit 202 performs rollback processing for rolling back the information used in the installation processing to the point before the installation processing. The information used in the installation processing refers to, for example, an installed file, a temporary file, or a registry. If installation of the application has failed, rollback processing of software pieces which were necessary for installation of the application is not performed. However, if the installation processing has failed during the installation of these software pieces, the installer execution unit 202 performs rollback processing in accordance with specification of the software. After the rollback processing is completed, the processing in the present flowchart ends.

Figure 14:
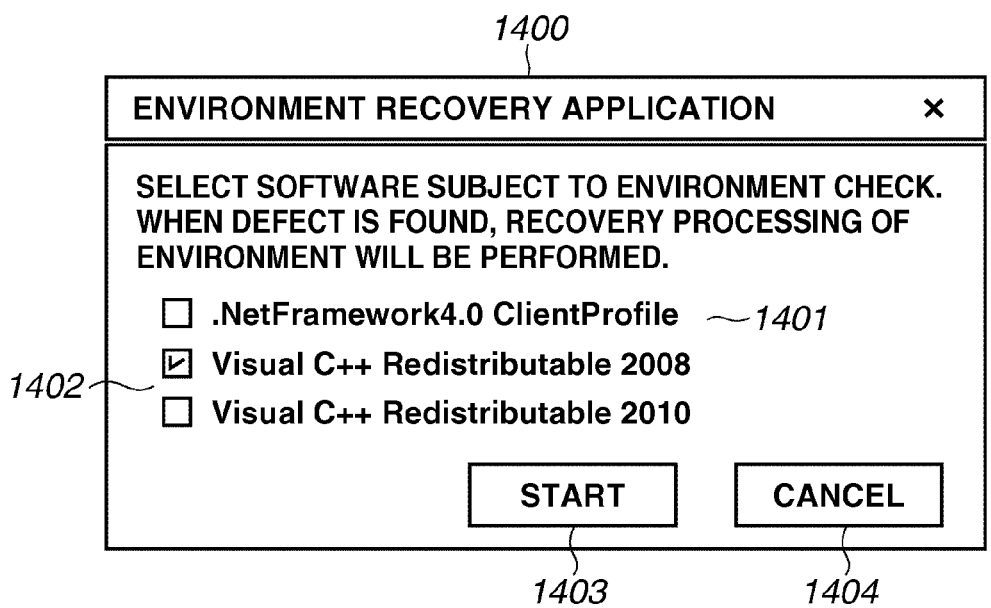
FIG. 14 illustrates an example of a UI of an environment check application.

According to the first and second exemplary embodiments described above, software to be a target of the environment check cannot be selected. According to a third exemplary embodiment, as illustrated in FIG. 14, an example is described in which an expansion function for enabling a user to select related software to be a target of the environment check is provided on the user interface of the environment recovery application 210. This configuration can be also applied to the first and second exemplary embodiments described above.

An environment recovery application window 1400 indicates a user interface of the environment recovery application UI unit 211. An environment check software list 1401 indicates a list of software pieces subjected to the environment check by the environment check application 220.

Check boxes 1402 allow the user to switch whether to perform the environment check of the software. Further, the environment recovery application window 1400 includes selection buttons 1403 and 1404 for selecting whether to perform the environment check. If a start button 1403 is pressed, the environment check application 220 is activated. On the other hand, if the selection button 1402 is pressed, the processing of the environment recovery application 201 ends without activating the environment check application 220.

According to the present exemplary embodiment, the user can intentionally exclude software which does not need to be checked from a check target at the time of installation or the like.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2012-085499 filed Apr. 4, 2012, which is hereby incorporated by reference herein in its entirety.

What is claimed is:

1. An information processing apparatus comprising:
an environment analysis unit configured to perform an analysis of information of software installed in the information processing apparatus to determine, when an application is installed, whether the application is installed by updating;
a setting unit configured to set, in a case where an application is installed and it is determined by the environment analysis unit that an installation target application is installed by updating, to activate the installation target application in a hardware rendering mode without performing determination relating to a version of an operating system operating on the information processing apparatus; and
a control unit configured to install, if software necessary for installing the installation target application is not installed, the necessary software,
wherein, if it is determined by the environment analysis unit that the installation target application is not installed by updating and if the version of the operating system operating is not a predetermined version, then the setting unit sets to activate the installation target application in the hardware rendering mode,
wherein the control unit installs the installation target application after installation of the necessary software,
wherein the installed application is activated according to a setting made by the setting unit,
wherein at least one of the setting unit and the control unit is implemented by a processor, and
wherein, if the software necessary for installing the installation target application has been already installed and, if a problem is detected when the control unit activates an environment check application for testing having a type that is the same type as that of the installation target application according to a setting set by the setting unit, then the control unit performs recovery installation of the necessary software and installs the installation target application after the recovery installation.

2. The information processing apparatus according to claim 1, wherein, if it is determined by the environment analysis unit that the installation target application is not installed by updating and if the version of the operating system operating is a predetermined version, then the setting unit sets the installation target application to be activated in a software rendering mode.

3. The information processing apparatus according to claim 1, further comprising a display unit for selecting the necessary software to be confirmed before the installation target application is installed by the control unit.

4. A method for an information processing apparatus, the method comprising:
performing, using a processor, an analysis of information of software installed in the information processing apparatus to determine, when an application is installed, whether the application is installed by updating;
setting, as a setting step and in a case where an application is installed and it is determined that an installation target application is installed by updating, to activate the installation target application in a hardware rendering mode without performing determination relating to a version of an operating system operating on the information processing apparatus; and
installing, if software necessary for installing the installation target application is not installed, the necessary software,
wherein, if it is determined that the installation target application is not installed by updating and if the version of the operating system operating is not a predetermined version, then setting includes setting to activate the installation target application in the hardware rendering mode,
wherein the installation target application is installed after installation of the necessary software,
wherein the installed application is activated according to a setting made by the setting step, and
wherein, if the software necessary for installing the installation target application has been already installed and, if a problem is detected when an environment check application is activated for testing having a type that is the same type as that of the installation target application according to a set setting, then installing includes performing recovery installation of the necessary software and installs the installation target application after the recovery installation.

5. The method according to claim 4, wherein, if it is determined that the installation target application is not installed by updating and if the version of the operating system operating is a predetermined version, then setting includes setting the installation target application to be activated in a software rendering mode.

6. The method according to claim 4, further comprising selecting, in a display unit, the necessary software to be confirmed before the installation target application is installed.

7. A non-transitory computer readable storage medium storing a computer program to cause an information processing apparatus to perform a method, the method comprising:
performing, using a processor, an analysis of information of software installed in the information processing apparatus to determine, when an application is installed, whether the application is installed by updating;
setting, as a setting step and in a case where an application is installed and it is determined that an installation target application is installed by updating, to activate the installation target application in a hardware rendering mode without performing determination relating to a version of an operating system operating on the information processing apparatus; and
installing, if software necessary for installing the installation target application is not installed, the necessary software,
wherein, if it is determined that the installation target application is not installed by updating and if the version of the operating system operating is not a predetermined version, then setting includes setting to activate the installation target application in the hardware rendering mode,
wherein the installation target application is installed after installation of the necessary software,
wherein the installed application is activated according to a setting made by the setting step, and
wherein, if the software necessary for installing the installation target application has been already installed and, if a problem is detected when an environment check application is activated for testing having a type that is the same type as that of the installation target application according to a set setting, then installing includes performing recovery installation of the necessary software and installs the installation target application after the recovery installation.

8. The non-transitory computer readable storage medium according to claim 7, wherein, if it is determined that the installation target application is not installed by updating and if the version of the operating system operating is a predetermined version, then setting includes setting the installation target application to be activated in a software rendering mode.

9. The non-transitory computer readable storage medium according to claim 7, further comprising selecting, in a display unit, the necessary software to be confirmed before the installation target application is installed.

* * * * *